United States Patent [19]
Gallagher et al.

[11] Patent Number: 5,682,035
[45] Date of Patent: Oct. 28, 1997

[54] THERMAL IMAGING DEVICE

[75] Inventors: Tim Gallagher; Richard Chin, both of Torrance, Calif.

[73] Assignee: Hughes Electronics

[21] Appl. No.: 524,200

[22] Filed: Sep. 6, 1995

[51] Int. Cl.[6] .................... H04N 5/33; H04N 5/57
[52] U.S. Cl. ............... 250/332; 250/334; 348/164; 348/166; 348/167; 348/201
[58] Field of Search ..................... 250/332, 334; 348/164, 166, 201, 678, 167

[56] References Cited

U.S. PATENT DOCUMENTS

| | | | |
|---|---|---|---|
| 3,895,182 | 7/1975 | Trilling. | |
| 4,032,975 | 6/1977 | Malueg et al. | |
| 4,225,883 | 9/1980 | Van Atta et al. | 358/113 |
| 4,408,231 | 10/1983 | Bushaw et al. | 358/280 |
| 4,536,089 | 8/1985 | Siebert | 356/352 |
| 4,763,192 | 8/1988 | Moore et al. | 250/332 |
| 4,873,442 | 10/1989 | Klatt | 250/334 |
| 5,099,330 | 3/1992 | Fuse et al. | 348/678 |
| 5,149,969 | 9/1992 | Fouilloy et al. | 250/334 |
| 5,185,883 | 2/1993 | Ianni et al. | |
| 5,274,235 | 12/1993 | Taylor | 250/332 |
| 5,302,824 | 4/1994 | Prager | 250/332 |
| 5,391,873 | 2/1995 | Cuthbertson | 250/334 |
| 5,453,618 | 9/1995 | Sutton et al. | 250/334 |
| 5,471,240 | 11/1995 | Prager et al. | 348/164 |

*Primary Examiner*—Michael J. Tokar
*Assistant Examiner*—Virgil O. Tyler
*Attorney, Agent, or Firm*—Gordon R. Lindeen, III; Michael W. Sales; Wanda K. Denson-Low

[57] ABSTRACT

A thermal infrared imaging device (10) includes a thermal detector (50) having a linearly-arrayed plurality of spaced apart detector elements (50', 50", 50'", . . . ). A scene to be viewed is scanned across the detector (50) with successive fields of the scene shifted according the spacing between adjacent detector elements (50', 50", 50'", . . . ) in order to capture image information for the entire scene by interlacing of successive scan lines from the plurality of detector elements (50', 50", 50'", . . . ). Each complete scan of the viewed scene across the detector (50) creates an image field including a scan line for each detector element (50', 50", 50'", . . . ). Each scan line includes plural pixels, or picture elements of the viewed scene, each having a value indicative of the thermal infrared brightness of the viewed scene at the corresponding location along the scan line. An scan-line sum for each scan line is created by adding the absolute values of the pixel values for each scan line. The average of these scan-line sums is employed as a gain control factor to control the brightness of a visible image replicating the viewed scene. Further, the value of a median of the scan-line sums is used to limit gain variations which would otherwise be effected were the line-sum averages alone used to control the gain factor. Accordingly, even when a localized highly-radiant heat source (such as a fire) is within the field of view of the thermal imaging device, then in areas of the image away from the brightness caused by the fire the image does not go dark and a visible image good contrast is still maintained allowing features of the image to be viewed.

16 Claims, 8 Drawing Sheets

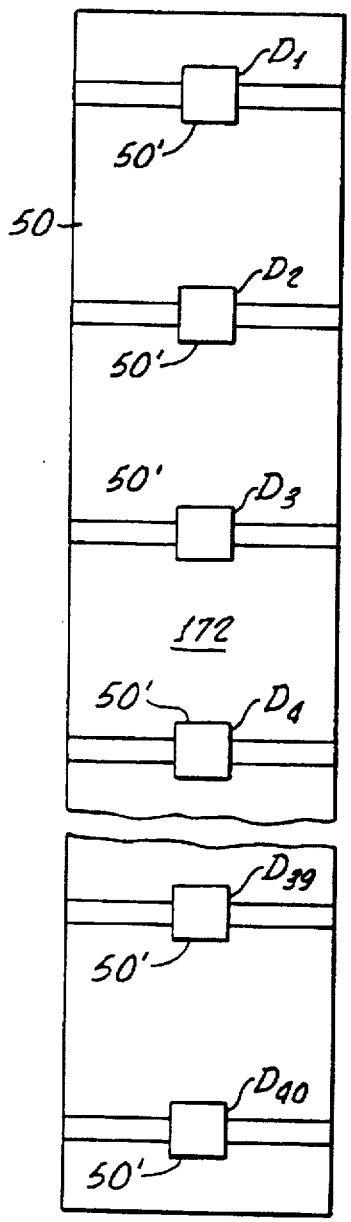
Fig. 4.
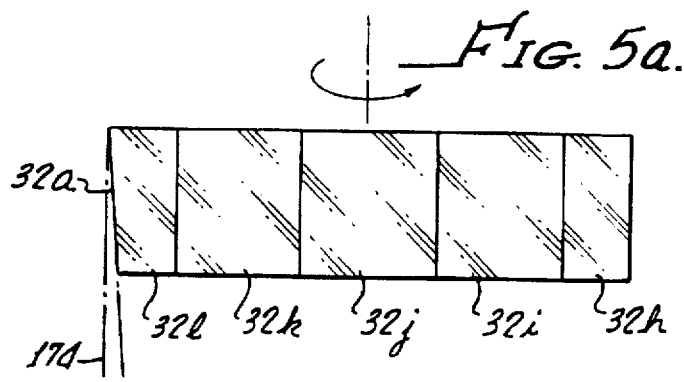
Fig. 5a.
Fig. 5b.
FACET FIELD
|   | 1 | 2 | 3 | 4 |
|---|---|---|---|---|
| 1 | 32a | 32b (R) | 32c | 32d |
| 2 | 32e | 32f (+) | 32g | 32h |
| 3 | 32i | 32j (−) | 32k | 32l |

| FRAME 1 | | | | FRAME 2 | | | | FRAME 3 | | | |
|---|---|---|---|---|---|---|---|---|---|---|---|
| $a$ | $b^{(R)}$ | $c$ | $d$ | $e$ | $f^{(+)}$ | $g$ | $h$ | $i$ | $j^{(-)}$ | $k$ | $l$ |
| | | | | | ⓘ$D_1$ | | | | | | |
| | | | | | | | | | | | |
| | | | | | | | | | | | |
| 1 | $\overrightarrow{D_1}$ | | | | $D_1$ | | | | $D_1$ | | | |
| 2 | | ⓘ$D_1$ | | | | ⓘ$D_2$ | | | | Ⓞ | | |
| 3 | | | $D_1$ | | | | $D_1$ | | | | $D_1$ | |
| 4 | | | | $D_1$ | | | | $D_1$ | | | | $D_1$ |
| 5 | $\overrightarrow{D_2}$ | | | | $D_2$ | | | | $D_2$ | | | |
| 6 | | ⓘ$D_2$ | | | | ⓘ$D_3$ | | | | ⓘ$D_1$ | | |
| 7 | | | $D_2$ | | | | $D_2$ | | | | $D_1$ | |
| 8 | | | | $D_2$ | | | | $D_2$ | | | | $D_1$ |
| 9 | $\overrightarrow{D_3}$ | | | | $D_3$ | | | | $D_3$ | | | |
| 10 | | ⓘ$D_3$ | | | | ⓘ$D_4$ | | | | ⓘ$D_2$ | | |
| 153 | $\overrightarrow{D_{39}}$ | | | | $D_{39}$ | | | | $D_{39}$ | | | |
| 154 | | ⓘ$D_{39}$ | | | | ⓘ$D_{40}$ | | | | ⓘ$D_{38}$ | | |
| 155 | | | $D_{39}$ | | | | $D_{39}$ | | | | $D_{39}$ | |
| 156 | | | | $D_{39}$ | | | | $D_{39}$ | | | | $D_{39}$ |
| 157 | $\overrightarrow{D_{40}}$ | | | | $D_{40}$ | | | | $D_{40}$ | | | |
| 158 | | ⓘ$D_{40}$ | | | | Ⓞ | | | | ⓘ$D_{39}$ | | |
| 159 | | | $D_{40}$ | | | | $D_{40}$ | | | | $D_{40}$ | |
| 160 | | | | $D_{40}$ | | | | $D_{40}$ | | | | $D_{40}$ |
| | | | | | | | | | ⓘ$D_{40}$ | | |

FIG. 6.

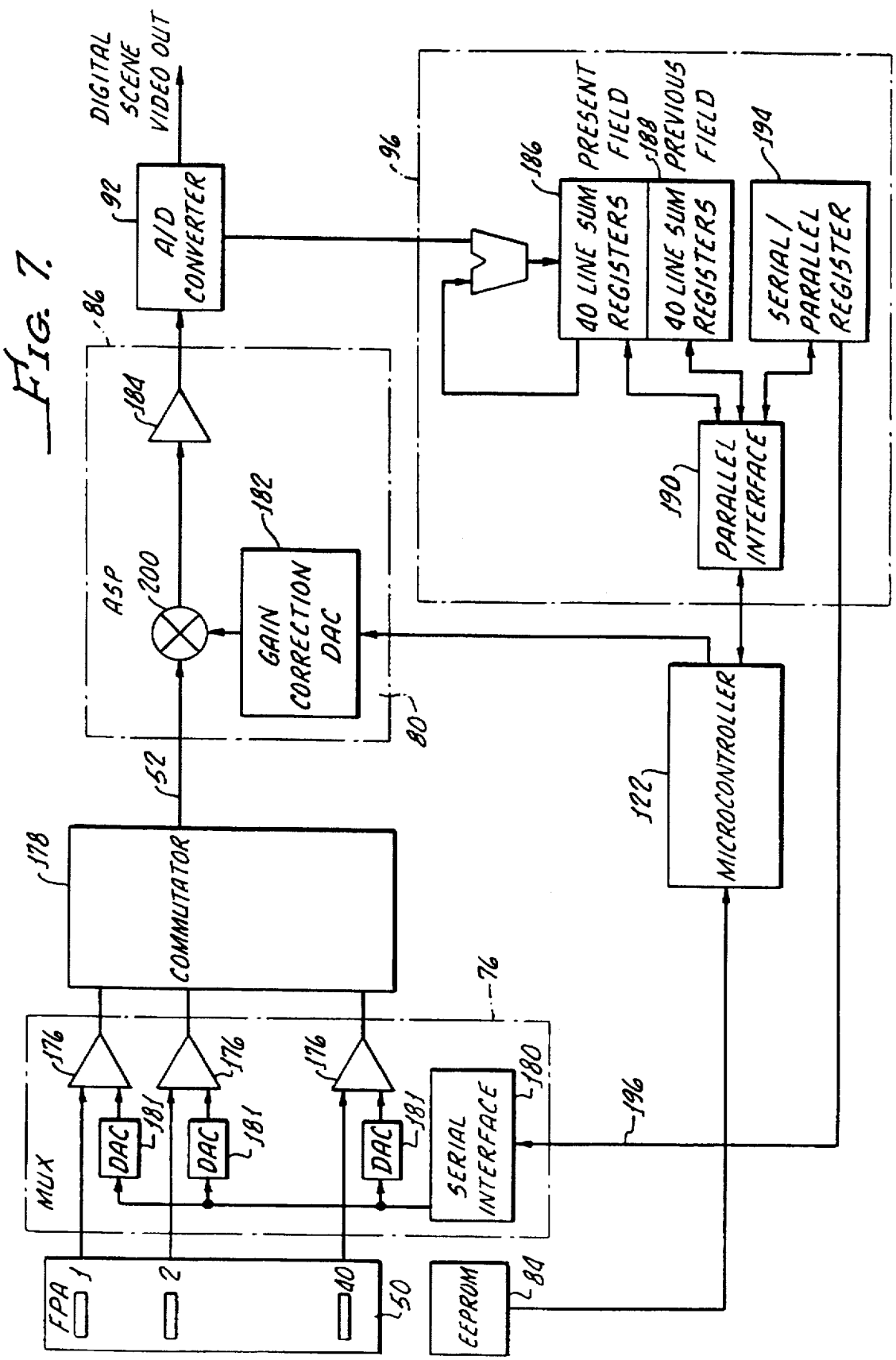

THERMAL IMAGING DEVICE

This invention was made with government support under Contract No. DAAB07-91-C-K254 awarded by the Department of Army. The Government has certain rights in this invention.

BACKGROUND OF THE INVENTION

1. Field of the Invention

The present invention is in the field of imaging devices. More particularly, the present invention relates to devices for receiving invisible infrared light from a scene, and for providing a visible-light image replicating the scene.

2. Related Technology

Night vision devices have been available for many years. One category of these conventional night vision devices uses image intensifier technology. This technology is effected using a device generally known as an image intensifier tube. The image intensifier tube is essentially a frequency-shifting and amplifying device receiving ambient light, which light may include visible light too dim to provide natural vision (i.e., so-called "Star Light" scopes), or invisible near-infrared light, in a first frequency band and responsively providing a greatly intensified visible image in a phosphorescent monochrome yellow-green light.

Such an image intensifier night vision device converts available low-intensity ambient light to a visible image which a human user of the device may use for surveillance or weapon aiming, for example, under lighting conditions of too dim to allow a scene to be viewed with the natural vision. These image intensifier night vision devices require some residual light, such as moon or star light, in which to operate. This light is generally rich in near-infrared radiation, which is invisible to the human eye. The present generation of night vision scopes use a photoelectrically responsive "window", referred to as a photocathode, which is responsive to the dim or invisible ambient light focused on this "window" from an invisible scene to provide a pattern of photo-electrons flowing as a space charge moving under the influence of an applied electrostatic field, and replicating the scene being viewed. This pattern of photo-electrons is provided to a microchannel plate, which amplifies the electron pattern to a much higher level. To accomplish this amplification at the microchannel plate, the pattern of photo-electrons is introduced into a multitude of small channels (or microchannels) which open onto the opposite surfaces of the plate. By the secondary emission of electrons from the interior surfaces of these channels a shower of electrons in a pattern corresponding to the low-level image is produced. The shower of electrons, at an intensity much above that produced by the photocathode, is then directed onto a phosphorescent screen, again by the application of an electrostatic field. The phosphors of the screen produce an image in visible light which replicates the low-level image.

Image intensifier tubes have evolved from the so-called "Generation I" tubes through the more recent "Generation III" tubes, which provide greater amplification of available light and greater sensitivity to infrared light somewhat deeper into the infrared portion of the spectrum. However, these image intensifier devices are limited with respect to the depth into the infrared portion of the spectrum to which they can operate.

Another category of conventional night vision device is represented by the cryogenically cooled focal plane array thermal imaging devices. These devices use a photoelectrically responsive detector which is cooled to a temperature in the cryogenic range to reduce unwanted thermal noise. The detector includes a plurality of detector elements, or "pixels", each of which provides an electrical signal indicative of the flux of infrared light falling on the detector element. Some such devices use a staring focal plane array; while others have a linear focal plane array of detector elements, and require the use of a scanner to sequentially move portions of the view scene across the detector. In either case, because the detector is cooled to cryogenic temperatures, it can provide an electrical response to invisible infrared light much deeper into the infrared part of the spectrum than is possible with the image intensifier devices. The electrical signal provided by such a detector must be processed and converted to a visible image. For this purpose, many such devices of this category have used cathode ray tubes, liquid crystal displays, and other such display technologies to provide a visible image to the user of the device.

Conventionally, it has been known in the art of thermal imaging devices to average the signal level from the scene in order to control the gain applied to the image signals from this scene. This averaged gain signal takes into account all of the thermal sources in the field of view of the conventional device, and applies a gain factor intended to provide the best average contrast for a view of the scene. These gain correction factors have been calculated based on a histogram of the signal levels, on a root-mean-value of the signal levels, and on the absolute value of the signal on average. However, it must be realized that the world has very low contrast in the thermal infrared spectrum. The degree of available contrast is analogous to looking for a white rabbit sitting on a snow-covered field. Further, one can imagine the difficulty in seeing this rabbit if the sun were low on the horizon behind the rabbit and reflecting from the snow. For a normally sighted person, the pupils of the eye would contract because of the bright light from the sun. In this situation the small contrast difference for the rabbit and the snow field would make the rabbit practically impossible to see.

Similarly, with a conventional thermal imaging device, a strongly-radiating hot object or fire in the field of view acts like the sun, causing the gain applied to the viewed scene to be reduced (like the closing of an eye's pupil). Consequently, all other objects in the scene go dark. Even at locations of the scene away from the hot bright fire, the features of the scene cannot be made out because the gain factor is reduced to the point that all of the image except the fire is dark and without contrast. Moreover, especially because of the very low contrast in the world as seen in the thermal infrared portion of the spectrum, a comparatively small hot spot in the field of view of a conventional thermal infrared imaging device can cause the image to darken so severely that all other features of interest in the scene are without contrast, and effectively are not imaged. These objects which are not imaged are effectively invisible to the user of such a conventional device.

A device of the thermal infrared imaging category is known in accord with U.S. Pat. No. 4,873,442, issued 10 Oct. 1989 to Robert W. Klatt (hereinafter, the '442 patent). The device of the '442 patent uses a sensor with a linear array of elemental detectors each spaced apart from the next-adjacent detector element by a distance about equal to the size of the detector elements themselves along the length of the linear array. Accordingly, the sensor could capture about half of the image information from a scene or object space with each field, or scan of the sensor across the object space. However, in order to detect and compensate for non-uniformity in responsivity of the detector elements, the '442 patent teaches to overlap the scan lines of all of the detector elements in successive scan fields so that each field is missing image information from at least one detector element. That is, no field of the '442 patent uses all of the detector elements to respond to signal (image information) from the scene. At least one detector element at one end of the linear array scans a space outside of the object space and provides no useful image information. According to the example set forth in the '442 patent, each field is missing a fractional part of its maximum possible image information, which fraction is equal to 1/n, where n is the number of detector elements. The remaining n-1 detector elements are used to capture half of the image information from the object space for each field. Each field thus presents 90 percent of the image information that it could contain were all detector elements used. Accordingly, each frame of two fields of the '442 patent presents a complete object space image, but represents only 90 percent of the image information which it could provide were all of the detector elements used in each frame. Additionally, the possible number of lines of resolution which the sensor can provide is not fully used by the '442 patent.

A further significant disadvantage of this category of night vision device is the requirement for cryogenic cooling of the detector. Early devices of this category used a Dewar vessel into which a supply of a cryogenic fluid (such a liquid nitrogen) had to be provided by the user of the device. The utility of such devices was severely limited by their requirement for occasional replenishment of the cryogenic coolant. Later devices of this type have used cryogenic cooling developed by reverse Sterling-cycle coolers. However, such coolers require a considerable amount of power, are not without their own maintenance and reliability problems, and are generally noisy.

SUMMARY OF THE INVENTION

In view of the deficiencies of the conventional technology, a primary object for this invention is to overcome one or more of these deficiencies.

Another object for the present invention is to provide a thermal imaging device having a gain correction facility responding both to the average of the absolute value of image signals from the viewed scene, as well as to the median of such absolute image signal values so that a comparatively small hot spot in the field of view of the device does not cause the entire image to darken and lose contrast.

According to one aspect, the present invention provides a thermal imaging device including a detector array responsive to thermal infrared radiation, the detector array having a linearly-arrayed plurality of detector elements, a scanning device scanning the viewed scene across the plurality of detector elements, individually in response to incident infrared radiation the plurality of detector elements each providing a corresponding one of a plurality of detector-signals, the thermal imaging device comprising: an absolute value circuit providing a corresponding plurality of absolute-value signals each indicative of the respective absolute value of one of the plurality of detector-signals during a scan of the viewed scene across the detector, an averaging circuit providing an average-value signal indicative of the average of the plurality of absolute-value signals, and a median value compiler circuit providing a median-value signal indicative of the median of the plurality of absolute-value signals. These and additional objects and advantages of the present invention will be appreciated from a reading of the following detailed description of at least one preferred exemplary embodiment of the invention, taken in conjunction with the appended drawing Figures, in which the same reference numeral indicates the same feature, or features which are analogous in structure or function to one another.

DESCRIPTION OF THE DRAWING FIGURES

FIG. 1 provides a diagrammatic representation of the functionally cooperating physical components of a thermal imaging device embodying the invention;

FIG. 2 is a schematic block diagram of a thermal imaging device according to the present invention;

FIGS. 3a and 3b respectively provide an external view and an exploded perspective view of a thermal imaging device embodying the invention;

FIG. 4 presents a schematic view of a linear array sensor utilized in an embodiment of the invention described herein;

FIGS. 5a and 5b respectively present a schematic diagram of the facets of a scanning mirror of a thermal imaging device embodying the invention, and a chart of scanning mirror facet angle families, along with identification of three members of this facet angle family which have either a facet reference angle or one of a pair of a transposing facet angles;

FIG. 6 is an image space sequential scan chart for three sequential frames, each having four sequential fields;

FIGS. 7 and 8 present related block diagrams depicting the signal processing circuitry and methodology used to achieve economical non-uniformity detection and compensation, as well as global scene brightness level control in a viewing apparatus according to the present invention; and FIG. 9 presents a block diagram of circuitry used to control video image gain in the thermal imaging device embodying the present invention.

DETAILED DESCRIPTION OF AN EXEMPLARY PREFERRED EMBODIMENT OF THE INVENTION

An Overview

Figure 1:
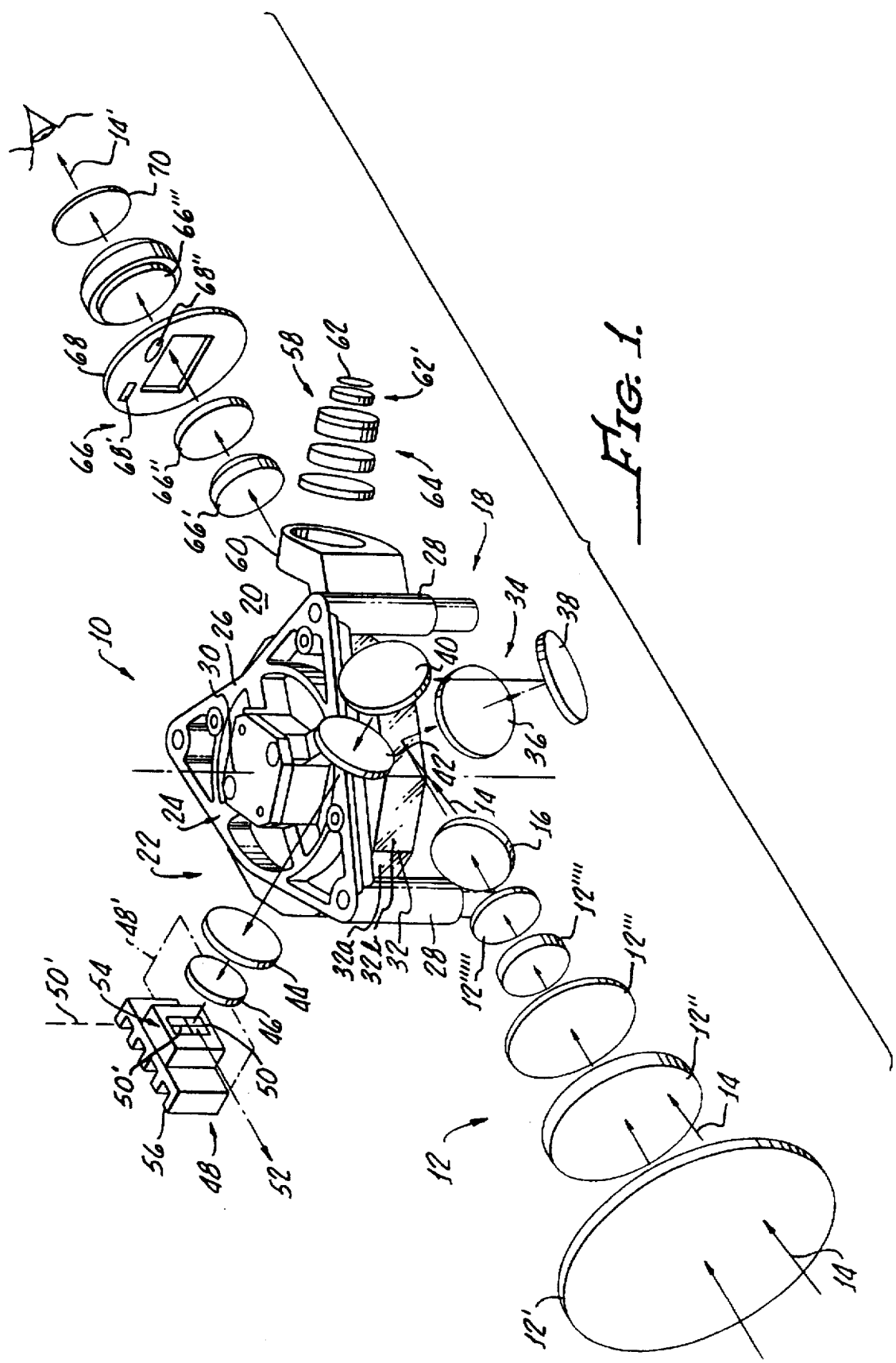

Viewing FIG. 1, a thermal imaging device 10 is diagrammatically depicted with its functionally cooperative physical components suspended in space without the depiction of a supporting housing (which housing is, of course, included by a physical embodiment of the device), so that these components and a ray-tracing diagram for light rays in the device can also be presented. Viewing FIG. 1 in detail, the thermal imaging device includes an objective optics group, generally indicated with the numeral 12. This objective optics group includes several lenses (indicated with reference numerals 12', 12", 12"', etc.), which lenses are transparent to light in the spectral band of interest (but not necessarily transparent to visible light). The objective optics group 12 is pointed toward a scene to be viewed, so that infrared light from this scene (indicated with the arrowed numeral 14) can be received and focused by this optics group. It will be understood that the objective optics group 12 seen in FIG. 1 is representative only, and that this optics group may be removed and replaced with objective optics of differing configurations, as will be further described. The objective optics group 12 concentrates and collimates received light through a window 16, which window is a permanent part of a basic sensor portion 18 of the device 10. In conjunction with the housing (to be described below) of this basic sensor portion 18, this window 16 bounds a sealed chamber 20 in which are received almost all of the remaining components of the device 10 as illustrated in FIG. 1.

Within the housing chamber 20 is received a scanner, generally referenced with the numeral 22. This scanner 22 includes a scanner frame 24, which is generally of triangular or tripod configuration in plan view. The scanner frame 24 includes a generally triangular upper wall portion 26, and three depending leg portions 28, only two of which are visible in FIG. 1. Carried by the wall portion 26 is a scanner motor, generally indicated with the numeral 30. This scanner motor 30 includes a generally vertically extending rotational drive shaft (not visible in the drawing Figures) drivingly carrying a disk-like circular multi-faceted scanning mirror 32. The scanning mirror 32 includes plural outwardly and circumferentially disposed adjacent facets or faces 32a, 32b, etc. only a few facets of which are seen in any one of the drawing Figures. This scanning mirror 32 rotates in a generally horizontal plane to reflect light 14 received via the window 16 and objective optics group 12 to an image optics group, generally indicated with the numeral 34. It will be noted that because of rotation of the scanning mirror 32, the facets 32a, 32b, etc., continually change their angulation in the horizontal plane with respect to the scene viewed via the objective optics group 12.

Considering the image optics group 34 in greater detail, it is seen that light (arrow 14) reflected from a facet of the scanning mirror 32 passes through a lens 36 and to a pair of vertically spaced angulated mirrors 38, and 40. The mirror 40 reflects this light through an additional pair of lenses 42, and 44 toward a window 46 carried by a Dewar vessel 48. The Dewar vessel 48 includes a thermally insulative housing, generally indicated with the dashed line and the reference numeral 48'. This Dewar vessel 48 houses a linear focal plane infrared detector 50 having a linearly-arrayed multitude of small infrared detector elements, indicated collectively on FIG. 1 with the vertical line 50' on detector 50. Each of the detector elements 50' of the detector 50 provides a corresponding one of a like multitude of electrical signals each of which indicative of the flux level of infrared light falling on the particular detector element. These electrical signals are provided outwardly of the Dewar vessel 48 by an electrical interface (to be further described), and indicated on FIG. 1 with the dashed line 52.

In order to cool the detector 50 to a sufficiently low temperature that thermally excited electrons (as opposed to electrons excited by photons of infrared light falling on the detector 50) do not cause an undesirably high level of electrical noise which would hide the desired photoelectric image signal, the Dewar vessel 48 includes a multi-stage reversed Peltier-effect (i.e., thermoelectric) cooler 54. The thermoelectric cooler 54 has a chilling face to which the detector 50 is mounted to be cooled, and a heating face in heat transfer relationship with a heat sink schematically indicated with the numeral 56. In the physical embodiment of the imaging device 10, the heat sink 56 is defined by a metallic portion of the housing for the device 10 as will be seen. It will be understood that because of the continuous change in angulation of each facet 32a, 32b, etc., of the scanning mirror 32 as this mirror rotates in a horizontal plane, the scene reflected from each particular facet sweeps horizontally across the linear array of detector elements 50' (i.e., perpendicularly to the vertical linear array of these detector elements). The detector elements 50' responsively provide electrical signals (via interface 52) which are indicative of the flux levels of infrared light falling on corresponding ones of the plural detector elements 50' from a particular part of the scene during any one sweep of a scene portion across the detector 50.

In order to provide a visible image to be viewed by a user of the imaging device 10, a light emitting diode (LED) projection array module 58 is carried by an apertured flange portion 60 of the scanner frame 26. This LED projection array module 58 includes a linear LED array 62, which array includes a multitude of individual LED's (not visible in FIG. 1, but indicated with the arrowed numeral 62'), each individually emitting visible light when energized. The LED's 62' of the array 62 are arrayed linearly along a vertical line similarly to the linear arrangement of the detector elements 50' of the detector 50. The LED's 62' provide respective portions of a visible image, as will become apparent. Light from the LED's 62' is collimated and projected by a projection lens group, generally indicated with the numeral 64, onto a facet of the mirror 32, and as indicated by the arrowed reference numerals 14'. The numerals 14 and 14' are used intentionally with respect to the invisible infrared light carrying image information from a scene, and the visible light replicating the scene for viewing by a user of the device 10.

From the mirror 32 (i.e., from a particular facet 32' of this mirror) the visible light from the LED's 62' is reflected to an ocular lens group, generally indicated with the numeral 66. The ocular lens group 66 includes several individual lenses, indicated with the respective reference numerals 66', 66", etc. Along with these lenses 66', 66", etc., a status display unit 68 is interposed in the ocular lens group 66. This status display unit 68 defines an aperture through which the visible image is perceived, and includes several individual LED's which when illuminating are peripherally visible to the user of the device 10. These individual LED's are indicated with the numerals 68', 68", etc. Finally, the imaging device 10 includes a pair of eyepiece shutters 70. These shutters 70 are biased closed to prevent light emanations from the device 10 when a user's face is not pressed against a movable eyepiece member (to be described below). When the user presses against the movable eyepiece member, the shutters 70 open to allow the user to view the visible light image provided by the LED projection display module and the spinning mirror 32.

Figure 2:
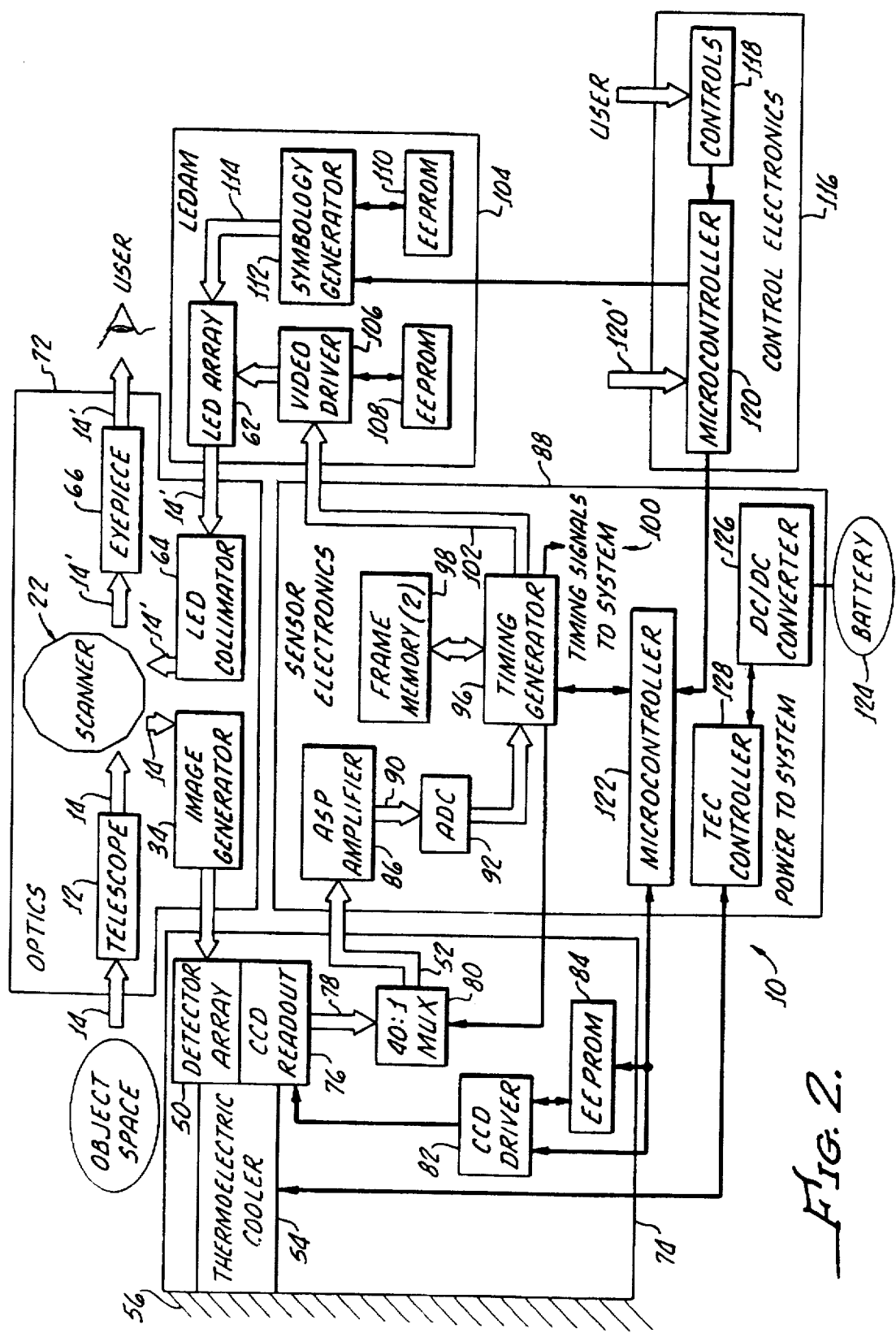

Viewing now FIG. 2, a schematic functional block diagram of the thermal imaging device 10 is presented. This thermal image device 10 is divided into functionally modular portions, as is indicated by the boxes encircling the various components of the device, with some of the modules including several sub-modules or components. The module 72 manages both invisible and visible light, and includes the objective optics group 12 receiving the invisible infrared light 14 from a scene to be viewed, the scanner 22, and image optics group 34 directing this invisible light to the detector 50. This light management module 72 also receives visible light from the LED array 62, and includes the projection lens group 64 projecting this light to the scanner 22, and ocular lens group 66 providing the image to a user of the device.

Detection module 74 is enclosed within the Dewar vessel 48, and receives the focused invisible infrared light 14 from the scene to be viewed. This module 74 includes the detector 50, along with a readout circuit 76 providing multiple channels of electrical image signal 78 (one channel for each detector element of the linear detector array 50, recalling the description above) to a multiplexer circuit (MUX) 80. The MUX 80 provides the electrical interface output 52 in the form of a serial analog image signal. Detector module 74 also includes a driver circuit 82 providing control commands to the readout circuit 76. An electrically erasable programmable read-only memory (EEPROM) 84 is included in the detection module 74 to locally store and provide data on the operation of the readout circuit 76, providing compensation factors locally for a number of gain-control and non-uniformity compensations in connection with the infrared detector 50. As can be seen from FIG. 2, the various circuits of the module 74 have electrical interface with other modules of the device 10.

The serial analog image signals 52 provided by module 74 are received by an analog signal processor (ASP) 86 which is located in a process-and-control (P&C) module 88. A processed serial analog image signal 90 is provided by the ASP 86 to a analog-to-digital converter (ADC) 92. A resulting processed serial digital image signal 94 is provided to a timing generator 96. This timing generator 96 has an interface with the multiplexer circuit 80 to control the timing of operation of this circuit. A frame memory 98 is interfaced with the timing generator so that image information which is global to the scene being viewed may be stored and retrieved for use in providing gain adjustment, contrast, and other compensation factors for use in processing the image signals obtained from the detection module 74. Timing generator 96 also provides a system-wide timing control signal, indicated with the reference numeral 100. This timing control signal is used to operate several other features of the imaging device 10, including control of the rotational speed and position of the mirror 32 so as to achieve time-correlation of the operation of the detector 50, mirror 32, and LED array 62.

A serial digital image signal 102, compensated and time-correlated, is provided by the timing generator 96 to a display module 104. This display module 104 includes the LED projection array module 58, along with a driver circuit 106 for receiving the signal 102 and driving the individual LED's 62' in response to this signal. An electrically erasable programmable read-only memory (EEPROM) 108 has an interface with the driver circuit for receiving and storing for future use values to be used in the operation of the device 10. For example, EPROM 108 may be used to store stadia line spacing information, which would allow the device 10 to be used to estimate ranges to personnel or vehicles of known sizes. In order to provide a user of the imaging device 10 with additional useful image information, such as spaced apart comparative-size lines for humans and various types of vehicles so that ranges can be estimated, or with a reticle of various kinds and sizes in accord with the range to an object being viewed and the use being made of the device 10 at a particular time, the display module 102 also includes another electrically erasable programmable read-only memory (EEPROM) 110 for storing such image information. This image information, as selected by the user of the device 10, is provided to a symbology generator circuit 112, which in turn provides a symbology signal 114 to the LED array 62. The array 62 includes separate light emitting diodes (LED's) for receiving the signal 114.

In order to complete this description of the imaging device 10 as illustrated in FIG. 2, it should be noted that the device 10 includes an input-output (I/O) module 116. This I/O module 116 allows a user of the device 10 to input commands via a set of externally-accessible controls 118, such as a set of momentary contact push button switches which may be operated from outside the housing of the device 10. The controls 118 have an interface with a microprocessor 120, which is part of distributed control system also including another microprocessor 122 in the P&C module 88. The microprocessors 120 and 122 have an interface with the EEPROM's 84, 108 and 110, along with the circuits served by the data and commands stored in these EEPROM's. The microprocessor 120 has an externally-accessible data interface port 120' so that all of the data and programming stored in the microprocessors 120, 122, and the EEPROM's interfaced with these microprocessors, and the circuits served, may be inserted and changed by access to the port 120'. Finally, it is seen that the P&C module 88 provides power input to the system from a power source, such as from a battery pack 124. A DC/DC power converter 126 provides power to various modules and components of the device 10 at appropriate voltage and current levels. One of the circuits powered from converter 126 is a controller 128 for the thermoelectric cooler 54.

Figure 3A:
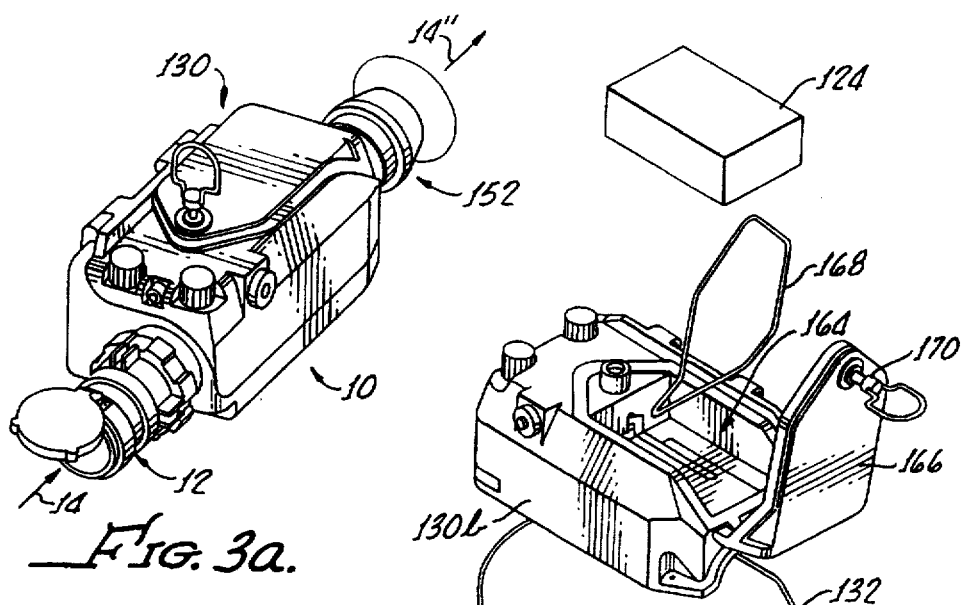
Figure 3B:
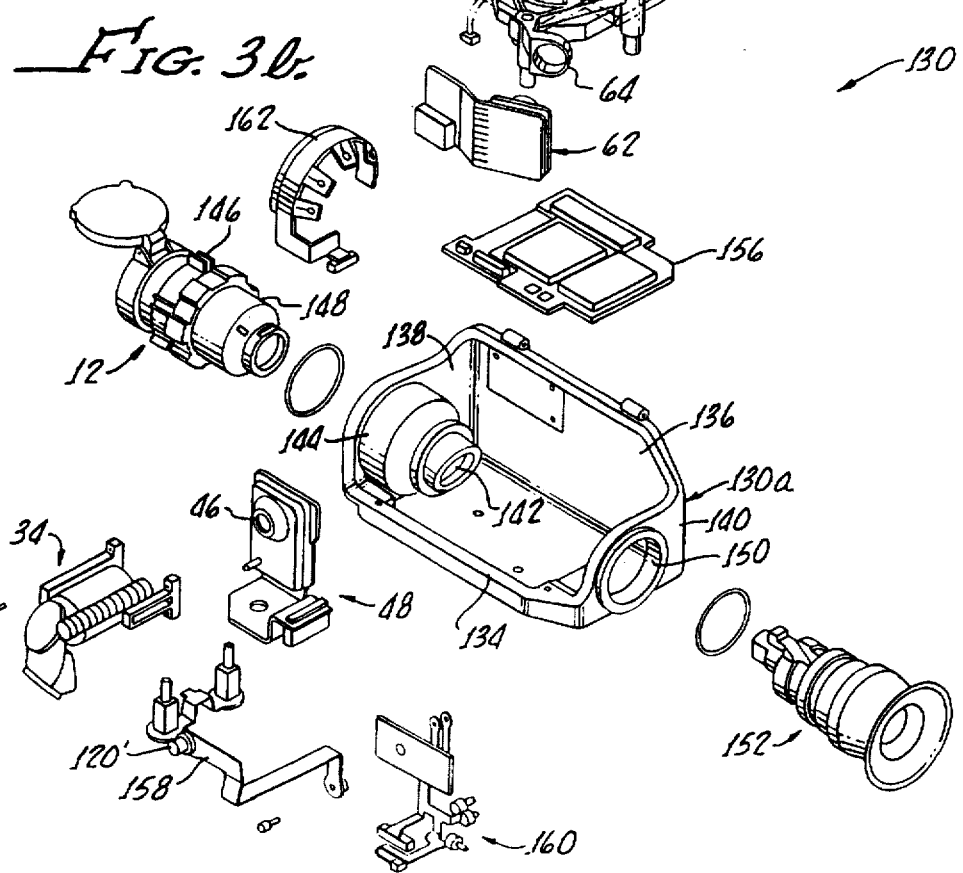

Turning now to FIGS. 3a and 3b, a physical embodiment of the imaging device 10 is presented in external view and in exploded perspective view, respectively. The imaging device 10 includes a two-piece chambered housing 130. This housing includes two pieces 130a and 130b which sealingly cooperate (via an intervening sealing member 132) to bound the chamber 20 within this housing. The part 130a of the housing 130 is fabricated of cast non-magnetic metal (of aluminum, for example), is somewhat L-shaped in transverse cross section, and provides a lower wall portion 134, a side wall portion 136, and an apertured pair of opposite front (138), and rear (140) wall portions. This housing part 130a provides a heat sink for the thermoelectric cooler 54, and a base (i.e., in effect, an optical bench) to which the optical and other components of the device 10 are mounted, as will be seen.

The front wall portion 138 of housing part 130a defines a reentrant portion 142 which forwardly defines a somewhat conical recess (not visible in the drawing Figures), and which at its aft end carries the window 16 in the aperture 144 of this wall. The objective optics group 12 is carried at this front wall 138 by a housing 146 which at its aft end defines a conical portion 148 for receipt into the front recess of the housing part 130a. The housing 146 is removably engageable with the housing part 130a to connect the objective optics group 12 in its proper location, and is also removable so that optics of different power may be fitted to the sensor portion 18. At the aperture 150 of the rear wall portion 140, the ocular lens group 66 is sealingly carried in a housing portion 152.

Within the chamber 20 of the housing 130, the scanner 24 is secured to the lower wall 134 by a trio of screws 154 which each pass through a respective vertically extending hole defined centrally of a corresponding one of the three legs 28 of the scanner frame 24. These screws threadably engage respective bores defined by the lower wall 134. Captured between the lower ends of the legs of the scanner frame 24 and the lower wall 134 of the housing 130 is an electronics assembly 156. This electronics assembly 156 includes a circuit board and many of the discreet and integrated circuit devices including micro-controller 122, which are necessary in order to effect the functions explained with respect to FIGS. 1 and 2. Also mounted to the lower housing part 130a, in addition to the already identified components and modules, which are indicated on FIG. 3b with their previously-introduced reference numerals, is an electronic cable assembly 158. This cable carries externally-accessible data interface port 120', the connector for which extends sealingly through a hole provided in the housing portion 130b, as is seen in this drawing Figure.

A Control electronics module 160 with its own cable assembly also mounts in the housing 130 and provides the control input momentary-contact switches 118 and micro-controller 120 identified with respect to FIG. 2. Finally, received in the housing 130 and circumscribing the reentrant portion 142 of the front wall 138 is a magnetic reed switch and cable assembly 162. This cable assembly with its several magnetically-responsive reed switches is responsive to one or more magnets carried in respective locations by various ones of the objective optics groups which can be used with the basic sensor 18. These magnets are located in particular locations (i.e., in a position code) on each objective lens set in order to provide a user both with differing levels of magnification of a distant scene, and differing symbology appropriate for the particular use for which the objective lens set adapts the sensor 18. When the basic sensor responds to the installation of a particular lens group, the user is provided with symbology and other internal adjustments of the operation of the sensor 18 automatically. The reed switches are able to sense the particular locations of the magnets on the lens groups (thus identifying the particular lens group) through the non-magnetic front wall portion 138 of the housing 130. Thus, no physical input is necessary from an operator to identify a particular lens group to the sensor 18, and the chamber 20 remains sealed.

Viewing now the housing portion 130b, it is seen that this housing portion defines a battery compartment recess 164 at an aft portion of the housing 130. This recess opens both upwardly and rearwardly on the housing part 130b. Battery 124 is received into the recess 164, and is covered sealingly in this recess by a hinged door member 166 with an intervening sealing member 168. The door 166 is somewhat L-shaped in side view, and is hinged adjacent to its rear edge to the housing part 130b. A latching device 170 is carried by the door 166 adjacent to its forward end, and is removably engageable with a recess feature of this housing part to retain the door 166 in its closed position, as is seen in FIG. 3a.

Detector Element Non-Uniformity Correction and Global Image-Level Control

Turning now to FIG. 4, it is seen that the detector 50 includes a semiconductor substrate 172, upon which the detector elements 50' are defined. These detector elements 50' are of finite size (i.e., about 50 microns or 0.002 inches square), and are depicted as being rectangular with equal edge dimensions (i.e., square), although other geometric configurations for the detectors 50' can be used with equal success within the scope of the present invention. Detector elements 50' may be defined on substrate 172 using chemical vapor deposition, or other appropriate semiconductor fabrication techniques, using an infrared responsive photoconductive material, such as mercury cadmium telluride, for example. These detector elements 50' become more conductive in response to incident infrared light flux. Consequently, each detector element 50' provides a respective electrical signal indicative of the infrared light flux (photons) incident upon the detector element during a sampling interval. For purposes of identification, the detector elements 50' are designated D with a subscript n, where n varies from 1 to 40 from top to bottom of the detector 50. Detector 50 includes 40 detector elements 50', each spaced from the next-adjacent detector element by a vertical spacing equal to substantially three times the vertical edge dimension of the detectors 50'. That is, adjacent edges of the elements 50' are about 150 microns apart, or enough space to allow three additional detector elements to be inserted between adjacent detector elements with adjacent sides touching.

FIGS. 5a and 5b present first a schematic representation of the scanning mirror 32, with a representation at line 174 of an angulation of a facet 32a, etc., of the mirror 32 relative to the perpendicular to the rotational plane of this mirror. The angulation of the line 174 is exaggerated in FIG. 5a, so that the reader may appreciate that the associated facet of mirror 32 is angulated to reflect incident light at a selected angle to the plane of this mirror 32. Each of the facets 32a, 32b, 32c, etc., of the mirror 32 are angulated selectively in order to vertically move the reflected scene as projected onto the detector 50 one fourth of the spacing distance between adjacent detector elements 50' compared to the position of the scene as reflected by adjacent facets. FIG. 5b shows that the facets 32a, 32b, 32c, etc., are arranged in families, with the members of the first family being disposed adjacent to one another sequentially around the mirror 32, and being followed next-sequentially by the second family of facets, and so on around the mirror 50. Each facet 32a, 32b, etc., as the mirror 32 rotates scans the viewed scene image across the detector 50, which detector captures one-fourth of this image as an image field, and each family of facets creates one complete frame of image information, as is further described below.

Further viewing FIG. 5b, it is seen that each facet family (frame) includes a facet 32b, 32f, or 32j, which is either a reference facet (32b), or a transposing facet (32f, or 32j). The reference facet 32b is an ordinary member of the facet family 32a–d, each facet of which displaces the reflected image portion onto the detector 50 one-fourth of the separation distance between detectors 50', compared to the adjacent facets in the family. However, the transposing facets 32f and 32j are additionally angulated respectively upwardly and downwardly to reflect the image portion on the detector 50 so that the image portion previously scanned across a detector element $50'_n$ is scanned across a detector $50'_{n+1}$, or $50'_{n-1}$, as is more fully described by reference to FIG. 6.

Viewing FIG. 6, a chart is presented which from top to bottom represents the scanning across an image space of 160 horizontal scanning lines (i.e., 160 lines of vertical resolution) which the present thermal imaging device achieves with only forty detectors. The vertical spacing from top to bottom of the chart of FIG. 6 is representative of the vertical distance from top to bottom of detector 50, recalling FIG. 4. The first column (for facet 32a) of FIG. 6 represents with an arrow associated with each detector element number the horizontal aspect of these scan lines extending across the viewed scene for detectors number 1 through 40 ($50'_n$–$50'_{n+39}$). Preferably, each detector element is sampled 512 times during the interval that the viewed scene is scanned across the detector elements 50' by each facet 32a of the scanning mirror 32. The next column of FIG. 6, for reference facet 32b, indicates that the next subsequent field of image from the viewed scene is reflected by facet 32b on the detectors 50' with a vertical displacement one-fourth the distance between adjacent detectors 50'. Similarly, each horizontal scan line for this field includes 512 sampling intervals or pixels for each detector element 50'. The detector locations in reference field 32b are circled on FIG. 6.

The following two facets 32c and 32d similarly capture a respective one-fourth of the image information from the viewed scene, and each have 512 horizontal sampling intervals for each scan line. The horizontal scan lines for the first field are interlaced so that the four fields make a complete image frame. Accordingly, it is seen that the first complete frame of four fields, captured as the four successive facets 32a–32d scan the viewed scene over the detector 50, captures the entire scene with interlacing of the scan lines from the 40 detector elements to achieve 160 lines of vertical resolution and 512 pixels of horizontal resolution.

Now viewing the next frame of FIG. 6, which is captured by facets 32e–32h as these facets reflect respective portions of the viewed scene across the detector 50, it is seen that this frame includes a transposed field corresponding to facet 32f, in which the horizontal scan lines of the viewed scene are reflected on detectors $50'_2$–$50'_{40}$, with the relative position of detector $50'_1$ being shifted upwardly outside of the field of view of the imaging device 10. That is, the reflected portion of the viewed scene is reflected by facet 32f on detector elements 50' which are transposed one detector element upwardly in comparison to the position of these scene portions in field 32b. Again, the locations of the detector elements in field 32f are circled on FIG. 6. The second frame includes all image information for the viewed scene, with the exception of the horizontal scan line in field 32f which would have been provided by detector element $50'_{40}$. Since detector element $50'_{40}$ is used to sense the scene scan line at the location of detector element $50'_{39}$, the scan line where detector $50'_{40}$ would have ordinarily been located (line 158) has a zero value. Comparing the first frame and second frame, it will be seen that the reference field (32b) and transposed field 32f have the same image information seen by detectors $50'_1$–$50'_{39}$ in the first frame as is viewed by detectors $50'_2$–$50'_{39}$ in the second frame.

Similarly, the third frame of FIG. 6 includes image fields 32i–32l, reflected onto the detector 50 by the correspondingly identified facets of mirror 32. This frame includes transposed field 32j, (with detector element locations circled on FIG. 6) which is relatively transposed downwardly by one detector element location, and has the scene portions viewed by detector elements $50'_2$–$50'_{40}$ in the reference field 32b reflected upon detector elements $50'_1$–$50'_{39}$. That is, in this case the relative position of detector element $50D_{40}$ is off the field of view of the imaging device 10, and the horizontal scan line which would otherwise be captured by detector element $50'_1$ has a zero value. Because these detector elements have viewed the same portion of the viewed scene, the signal levels from these detector elements should be the same.

Also, comparing the second frame and third frame, it will be seen that the field 32f and field 32j have the same image information seen by detectors $50'_3$–$50'_{40}$ in the second frame viewed by detectors $50'_1$–$50'_{38}$ in the third frame. Because these detector elements have viewed the same portion of the viewed scene, the signal levels from these detector elements should be the same. If the signals for these detector elements are not the same, this indicates a difference in the responsivity of the detector elements themselves. Two non-uniformity comparisons are possible for all detector elements except elements $50'_1$ and $50'_{40}$, viewing the circled locations on FIG. 6. One comparison is possible for these latter two detector elements 50'.

After the third frame, the scanning mirror 32 has completed one rotation, and the sequence described above repeats itself. Viewing the chart of FIG. 6, it is seen that frame 1 is complete with one-hundred percent of the image information which the detector elements 50' could possibly capture. Frames 2 and 3 are almost complete, with the exception of the absence of one horizontal scan line for each frame (i.e., line 158 in frame 2, and line 2 in frame 3), so that each of these frames include 159 horizontal scan lines. Overall, each sequence of three frames includes 160+159+159 scan lines for a total of 478 horizontal scan lines of image information out of a possible total of 480 such scan lines. This image capture effectiveness is equivalent to 99.6% of the possible image information which could be obtained with the 40 detectors 50' with 4:1 interlacing. A resolution of 160 vertical lines by 512 horizontal pixels per line is provided preferably for each frame, as was pointed out above.

Figure 8:
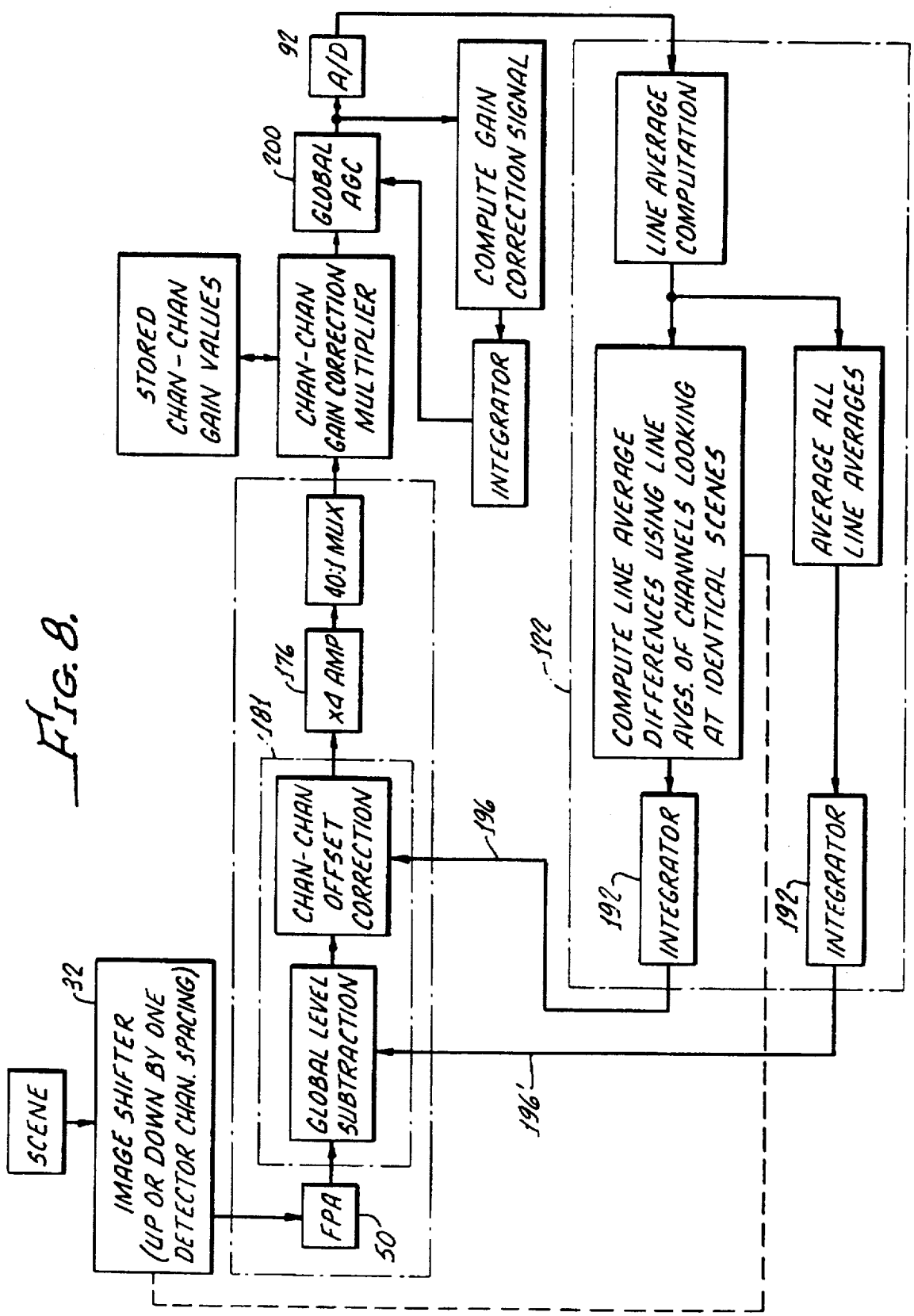

Viewing now FIGS. 7 and 8 together, the signal processing circuitry architecture and methodology used to obtain detection of and compensation for non-uniformity in the photo-conductivity and responsiveness to infrared light flux of the detector elements 50', as well as a global intensity control (i.e., overall thermal infrared image brightness level) for the image captured by the thermal imaging device 10 is depicted. Viewing first FIG. 7, it is seen that each of the detector elements 50' of the detector 50 has a respective analog direct-current connection to a corresponding channel in multiplexer 80, recalling the readout circuit connection 76 generally explained with respect to FIG. 2. This connection is not AC coupled, as would be conventional. Each connection includes a respective fixed-gain amplifier 176 providing a respective amplified signal to a commutator circuit 178, which effects the switching of the amplified signals from the detector elements 50' and amplifiers 176 into a serial analog signal stream (recalling the signal transferred by electrical interface 52 presented in FIG. 2). Each amplifier 176 receives a respective offset signal from a serial interface circuit 180 via a respective digital-to-analog (DAC) circuit 181. As will be explained, the offset signals for each detector element 50' are selected to compensate on a dynamic basis for differences or non-uniformities in the detector elements 50'. These differences or non-uniformities are detected by comparing the response of these detector elements when they view the same horizontal scan line of field 32b, 32j, as pointed out above, particularly recalling FIG. 6.

The resulting serial analog image signal stream is provided via interface 52 to analog signal processor 86. In this analog signal processor 86 a global gain correction for level of the video signal is applied to each analog signal in turn by a gain correction digital-to-analog converter 182. As will be seen, these gain correction signals are selected in view of a previously applied global level correction so that the resulting signals as amplified by an amplifier portion 184 of the ASP 86 are delivered to the A/D converter 92 corresponding on average to the mid-point or mid-scale level for an input signal to this converter 92, again recalling FIG. 2.

In order to achieve this signal processing, the timing generator 96 receives the digital scene video signals from A/D converter 92. For non-uniformity detection and correction, the timing generator uses a pair of 40-line registers 186, and 188. These registers are used to sequentially accumulate and hold line-sum values for the scanning lines of the reference field 32b, and for transposed fields 32f and 32j, as these fields sequentially are received by the detector 50. As each sequential field is received, the previous field values are shifted from register 186 to register 188 on a write-over basis for comparison purposes. That is, the signal levels for all 512 pixels of each scan line of these fields are added together in the registers 186, 188, and are averaged by microprocessor 122. FIG. 8 depicts graphically the signal processing methodology carried out as described above, and as is further described below. The microprocessor 122 has a parallel interface with the timing generator 96, which interface is indicated with circuit block 190, and arrowed numeral 190'. The microprocessor 122 performs the necessary scan line average computation for each field, and the necessary comparison among the scan line average values for fields 32b, 32f, and 32j on a sequential frame-by-frame basis to calculate the necessary offset signals for each detector in a dynamic attempt to drive the sequential differences between detectors looking at the same portion of the viewed scene to zero. A time integration of correction values to the offset signals is effected (see block 192 in FIG. 8) so that the offset signal values for the detector elements change at a rate allowing panning of the thermal imaging device over a scene without the scene variations so caused resulting in artifacts or spurious transients in the viewed image. The resulting offset signal levels are provided by microprocessor 122 via interface 190 to serial-parallel interface, and to serial-parallel interface 180 by the connection indicated with arrow 196.

Additionally, the same A/D converters 181 which are used to provide the offset values to the amplifiers 176 are also used to receive and apply a global level control signal by superposition with the non-uniformity correction offset signal. That is, FIG. 8 shows that the effect of the detector-to-detector non-uniformity correction offset signals and of a global level correction or control signal are applied to the amplifiers 176 by summation of these signals. The global level offset signal is applied in common to all 40 of the DAC's 181, and is provided by microprocessor 122. This global correction signal or offset signal is equivalent to the thermal "plateau" upon which the thermal image information from the scene exists. The height of this thermal plateau is variable dependent upon the average background temperature of the scene viewed with the device 10. This average thermal background signal level is subtracted out of the signals from the detectors 50' so that the thermal image information in these signals is more easily accessed. Moreover, microprocessor 122 computes the average of all 40 line averages calculated above, and provides the global level offset signal to the DAC's via interface 190 for superposition with the individual non-uniformity correction offset signals so that the average of all line averages satisfies a selected criteria.

As pointed out above, the selected criteria is that the signal provided by amplifier 184 to A/D converter 92 is on average to be at the mid-scale level for an input signal to this converter 92. This signal is indicated with the arrowed numeral 196' in FIG. 8. It will be noted that this global level calculation and offset signal provision has the effect of using the viewed scene as a thermal reference source for the thermal imaging device 10. No thermal reference source other than the viewed scene itself is required, which considerably saves on power consumption, complexity, size, and weight for the device 10. Also, the device 10 automatically adjusts for the various temperatures of the viewed scenes so that the signal level to the converter 92 is maintained in a selected range. As a result, no adjustment of the device 10 is necessary when a user of the device changes from looking at a relative cool scene, for example a scene viewed on the ocean, to a warmer scene, such as a forest after sundown on a warm day. The device 10 internally adjusts the global level offset signal so that the user sees an image neither too bright or too dim, but one having a uniform brightness.

Gain Control Using Both Average and Median of Image Signal Absolute Values

Further viewing FIG. 7 it will be recalled that the ASP 86 includes a gain correction DAC 182 receiving a command input from microprocessor 122, which input is indicated by arrow 198. FIG. 8 shows that the process and control module 88 includes a gain corrector facility 200 for calculating and applying a gain correction signal to the DAC 182. To put into perspective the reason for this gain control facility, it must be realized that the world has very low contrast in the infrared spectrum. Further, one can recall the difficulty which a normally sighted person experiences when trying to look past the bright head lights of an on-coming car. In a thermal imaging device, a hot object or fire in the field of view acts like such bright head lights and has the effect of causing a very high signal level from that part of the scene where the hot object is imaged. As a result, the remaining portion of the scene goes dark. Because of the low contrast in the infrared spectrum, a comparatively small hot spot in the field of view of an infrared (thermal) imaging device can cause the scene to darken so that other objects of interest in the scene are not imaged or are imaged with such low contrast that they are difficult to perceive. These objects which are not imaged are effectively invisible to the user of such a device.

Conventionally, it has been known in infrared imaging devices to average the signal level from the scene as discussed above, and to apply a gain correction factor based on this scene-averaged image signal level. However, this conventional expedient has the disadvantage of allowing most of the viewed image to go dark in the event that the user brings a hot object or fire into the field of view. Of course the fire or hot object will be imaged as a bright spot. However, the user will be effectively blind with respect to other objects not imaged by the conventional thermal imaging device. In order to prevent such a darkening of the image, the present thermal imaging device 10 includes a gain correction facility 200, which is more particularly presented in FIG. 9.

Figure 9:
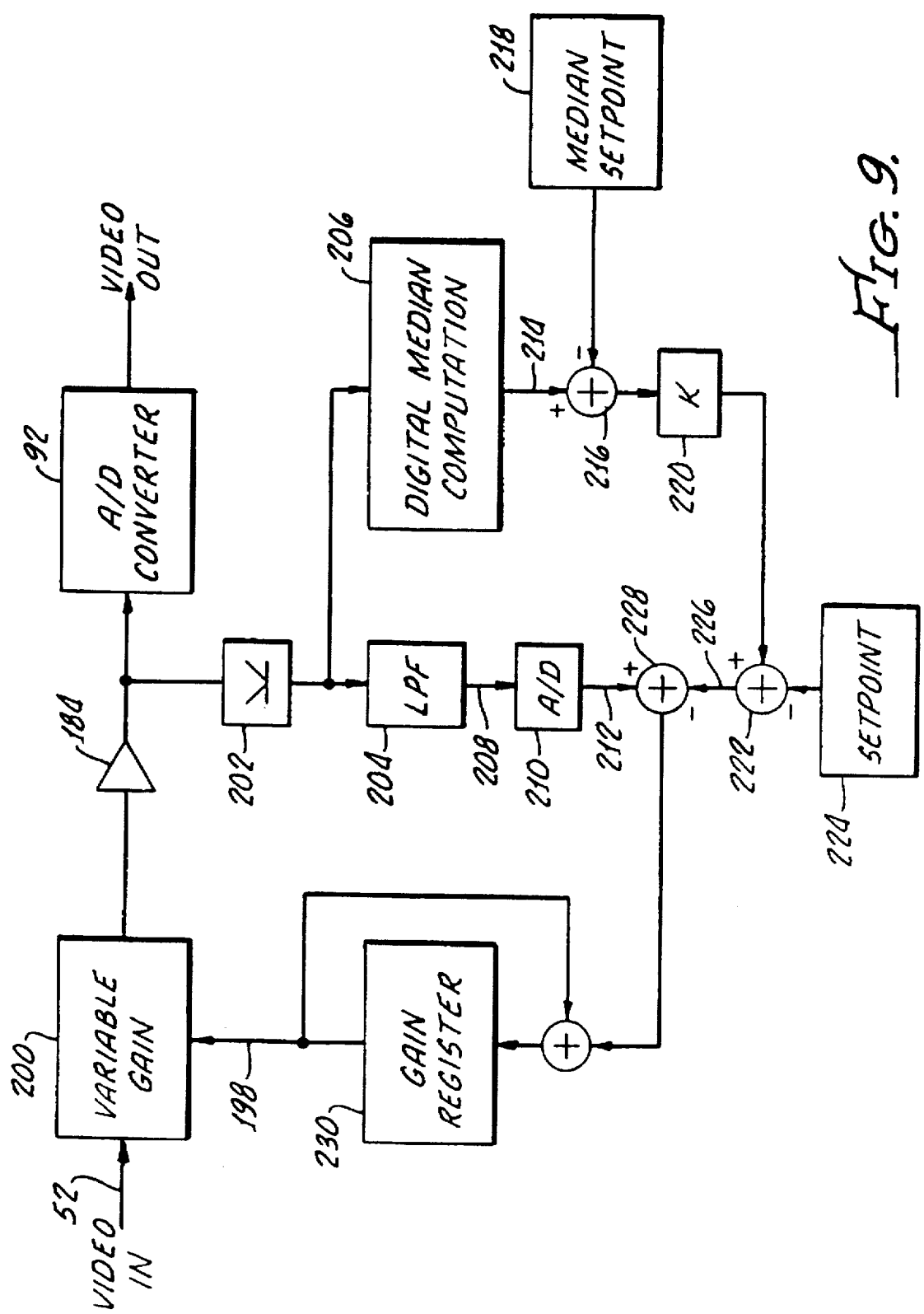

Viewing FIG. 9, it is seen that the gain correction facility 200 uses the microprocessor 122 to implement the functions diagrammatically illustrated. That is, an absolute value calculator 202 provides positive-valued absolute value signals indicative of the video signal provided to A/D converter 92. These absolute value signals are provided both to a low-pass filter 204, and to a median-value compiler 206. The low-pass filter 204 provides an output signal, indicated with arrow 208, which is indicative of the average value of the absolute values of the analog video image signal provided by the ASP 86. An analog-to-digital converter 210 provides a digital output signal, indicated with arrow 212, which is digitally indicative of the average of the absolute values of the video image signal from ASP 86.

Similarly, the median-value compiler 206 provides an indication of the signal value of the signal which is the median of all of the image signals provided from ASP 86. That is, the compiler 206 simply provides an indication of what the median absolute image signal value is, with half of the image signals having an absolute value above this value and half below this value. This median-value signal (arrow 214) is compared at junction 216 with a median set point value provided from set point indicator 218. In the event that there is a difference between the actual absolute value median value and the set point value from set point indicator (desirably this value is zero), then the difference is scaled by amplifier 220 and is provided to a junction 222. At this junction, a set point indicator 224 provides a set point value for limiting the degree of correction which may be effected by the median value compiler 206. The resulting signal (arrow 226) is applied to junction 228 in opposition to the average absolute value signal 212. A gain register 230 receives the resulting signal (i.e., an absolute value average signal limited by a scaled median of absolute value signal) and provides this signal via an internal time-integrator to the variable gain unit of facility 200.

As a result of this gain control circuit seen in FIG. 9, operation of the thermal imaging device when viewing a scene of generally uniform temperature is essentially the same as that of a conventional thermal imaging device. That is, the median value of the image signals will be essentially the same as the average value (both considered as absolute values), and the median-value compiler will have virtually no effect on the gain applied to the video image. However, in the event that the user brings a fire, for example, into the field of view of the thermal imaging device, then even if this fire represents only a small fraction of the area of the viewed scene, its thermal emission will be so much greater than the rest of the scene that the average value for the image signal (connection 52) is forced greatly upward. As a result, the average of the absolute value for this image will be much greater, and the gain register would be driven to a lower gain value. The gain would be reduced just as though the imaging device were directed at a highly emissive warm field of view. However, in this case the features in the field of view (other than the fire) are relatively cold, and a higher gain is necessary to image these features. Accordingly, under these conditions, the median of the absolute value will be increased only slightly because even though the fire has a high thermal emission, it represents only a small portion of the total scene area. Consequently, a decrease in the applied gain signal as a result of the regulatory action of the average-signal portion of the circuit (i.e., LPF 204) would significantly lower the median value because it affects the entire scene. The median-value compiler functions to apply a compensatory gain-increasing signal stabilizing the gain for the imaging device at a level which allows other objects and features in the field of view to be seen. Under these conditions, the portion of the display 58 imaging the fire will be driven to saturation, but the rest of the display will not be excessively darkened and will still image other features in the field of view of the imaging device 10.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A thermal imaging device including a detector array responsive to thermal infrared radiation, said detector array having a linearly-arrayed plurality of detector elements, a scanning device scanning a viewed scene across said plurality of detector elements, individually in response to incident infrared radiation said plurality of detector elements each providing a corresponding one of a plurality of detector-signals, said thermal imaging device comprising: an absolute value circuit providing a corresponding plurality of absolute-value signals each indicative of the respective absolute value of one of said plurality of detector-signals during a scan of said viewed scene across said detector, an averaging circuit providing an average-value signal indicative of the average of said plurality of absolute-value signals, and a median value compiler circuit providing a median-value signal indicative of the median of said plurality of absolute-value signals.

2. The thermal imaging device of claim 1 wherein said device further includes a variable-gain analog amplifier, and a gain correction circuit receiving said average-value signal and responsively providing a gain-correction signal controlling the gain value of said variable-gain analog amplifier.

3. The thermal imaging device of claim 2 wherein said gain correction circuit includes a median set point indicator providing a set point value for said median-value signal, and a comparator providing a median-comparison signal indicative of a difference between said set point signal value and said median-value signal.

4. The thermal imaging device of claim 3 wherein said gain correction circuit further includes an average-value set point indicator providing a set-point value for said average-value signal, and a respective comparator receiving said average-value signal and said set-point value signal and responsively providing an average-comparison signal indicative of a difference therebetween.

5. The thermal imaging device of claim 4 wherein said gain correction circuit further includes a comparator receiving said average comparison signal and said median-comparison signal as a limitation on the former signal and responsively providing a limited correction signal to said variable-gain analog amplifier to control the variable gain thereof.

6. A thermal imaging device including a detector array responsive to thermal infrared radiation, said detector array having a linearly-arrayed plurality of spaced-apart detector elements defining cooperatively a length dimension for said detector array, a scanning device scanning a viewed scene across said plurality of detector elements in a direction generally perpendicular to said length dimension, each of said plurality of detector elements providing a corresponding individual electrical signal indicative of the thermal infrared radiation incident thereon, individual detector elements in said plurality of detector elements varying from one another, said thermal imaging device comprising: an individual direct-current electrical connection from each one of said plurality of detector elements to a corresponding one of a plurality of fixed-gain analog amplifiers, said plurality of fixed-gain analog amplifiers each having electrical connection to a multiplexer for putting out a serial stream of analog signals indicative of the thermal infrared radiation flux incident upon said detector array, a compensation circuit responding to differences in electrical signals from identified ones of said plurality of detector elements which have scanned the same portion of said viewed scene to provide a respective compensation signal for said identified detector elements, and an electrical circuit applying said respective compensation signals to the ones of said plurality of fixed-gain amplifiers connected with the respective ones of said plurality of detector elements so as to modify the gain thereof to minimize said differences, an absolute value circuit providing a corresponding plurality of absolute-value signals each indicative of the respective absolute value of one of said plurality of detector-signals during a scan of said viewed scene across said detector, an averaging circuit providing an average-value signal indicative of the average of said plurality of absolute-value signals, and a median value compiler circuit providing a median-value signal indicative of the median of said plurality of absolute-value signals, a variable-gain analog amplifier receiving said serial stream of analog signals indicative of the thermal infrared radiation flux incident upon said detector array, and a gain correction circuit receiving said average-value signal and responsively providing a gain-correction signal controlling the gain value of said variable-gain analog amplifier.

7. The thermal imaging device of claim 6 further including a circuit for providing a level-correction signal equally to each one of said plurality of fixed-gain analog amplifiers for superposition with the respective one of said compensation signals.

8. The thermal imaging device of claim 7 further including an analog-to-digital converter receiving from said analog variable-gain amplifier said serial stream of analog signals indicative of the thermal infrared radiation flux incident upon said detector array, said analog-to-digital converter having a mid-scale signal value for an input signal thereto, and said circuit for providing a level-correction signal equally to each one of said plurality of fixed-gain analog amplifiers for superposition with the respective one of said compensation signals providing said level correction signal at a level which causes said serial stream of analog signals on average as received by said analog-to-digital converter to correspond substantially with said mid-scale signal value.

9. The thermal imaging device of claim 7 wherein said compensation circuit includes a register facility having a capacity equal to twice the number of detector elements in said plurality of detector elements, a first portion of said register facility receiving and storing in corresponding register locations values for said electrical signals corresponding to a first scan of said viewed scene across said detector, and a second portion of said register facility receiving and storing in corresponding register locations values for said electrical signals corresponding to a successive scan of said scene across said plurality of detector elements, and a calculation facility comparing the stored values of said first and second register portions for identified ones of said plurality of detector elements which have scanned the same portion of said viewed scene to provide a respective compensation signal for said identified detector elements.

10. The thermal imaging device of claim 9 wherein said calculation facility includes a microprocessor.

11. The thermal imaging device of claim 9 wherein said electrical circuit applying said respective compensation signals to the ones of said plurality of amplifiers connected with the respective ones of said plurality of detector elements includes a plurality of digital-to-analog (DAC) converters, said compensation circuit providing corresponding ones of said compensation signals to respective ones of said plurality of DAC converters in digital serial format, each one of said DAC converters individually providing a corresponding analog compensation signal to the respective one of said plurality of fixed-gain analog amplifiers.

12. The thermal imaging device of claim 11 wherein said circuit providing a corresponding level-correction signal equally to each of said fixed-gain analog amplifiers for superposition with the respective one of said compensation signals includes said microprocessor providing said level-correction signal equally to said respective ones of said plurality of DAC converters, each one of said DAC converters individually providing a corresponding equal level-correction analog signal to the respective one of said plurality of fixed-gain analog amplifiers.

13. A method of operating a thermal imaging device, said thermal imaging device including a detector array responsive to thermal infrared radiation, said detector array having a linearly-arrayed plurality of spaced apart detector elements cooperatively defining a length dimension for said detector array, a scanning device scanning a viewed scene across said plurality of detector elements in plural scans with relative transpositions of said viewed scene along the length dimension of said detector array in successive scans so as to capture image information from all of said viewed scene with said spaced apart plurality of detector elements, individually in response to incident infrared radiation said plurality of detector elements each providing a corresponding one of a plurality of electrical detector-signals, said method comprising:

providing an absolute value circuit;

using said absolute value circuit to provide a corresponding plurality of absolute-value signals each indicative of the respective absolute value of one of said plurality of detector-signals during a particular scan of said viewed scene across said detector array;

providing an averaging circuit;

using said averaging circuit to provide an average-value signal indicative of the average of said plurality of absolute-value signals;

providing a median value compiler circuit;

using said median value compiler circuit to provide a median-value signal indicative of the median of said plurality of absolute-value signals;

providing a gain correction circuit receiving said average-value signal and responsively providing a gain-correction signal;

providing a variable-gain analog amplifier;

using said variable-gain analog amplifier to receive and amplify said plurality of electrical detector-signals; and using said gain-correction signal to control a gain value of said variable-gain analog amplifier.

14. The method of claim 13 further including steps of:

providing a median set point indicator;

using said median set point indicator to provide a set point value for said median-value signal;

providing a comparator;

using said comparator to provide a median-comparison signal indicative of a difference between said median-value set point value and said median-value signal.

15. The method of claim 14 further including steps of:

providing an average-value set point indicator;

using said average-value set point indicator to provide a set-point value for said average-value signal, and using a respective comparator receiving said average-value signal and said average-value set-point signal and responsively providing an average-comparison signal indicative of a difference therebetween.

16. The method of claim 15 further including steps of:

providing an average/median comparator receiving said average-comparison signal and also receiving said median-comparison signal as a limitation on said average-comparison signal; and using said average/median comparator to responsively provide a limited gain-correction signal to said variable-gain analog amplifier to control the variable gain thereof.

* * * * *